United States Patent
Tsai et al.

(10) Patent No.: US 9,644,084 B2
(45) Date of Patent: May 9, 2017

(54) METHOD OF PREPARING CHITIN NANOFIBERS

(71) Applicant: NATIONAL TAIWAN OCEAN UNIVERSITY, Keelung (TW)

(72) Inventors: Min-Lang Tsai, Taipei (TW); Rong Huei Chen, Keelung (TW)

(73) Assignee: NATIONAL TAIWAN OCEAN UNIVERSITY, Keelung (TW)

( * ) Notice: Subject to any disclaimer, the term of this patent is extended or adjusted under 35 U.S.C. 154(b) by 210 days.

(21) Appl. No.: 14/509,718

(22) Filed: Oct. 8, 2014

(65) Prior Publication Data

US 2015/0361121 A1 Dec. 17, 2015

(30) Foreign Application Priority Data

Jun. 13, 2014 (TW) .............................. 103120515 A

(51) Int. Cl.
*C08B 37/08* (2006.01)
*C08L 5/08* (2006.01)
*B82Y 40/00* (2011.01)

(52) U.S. Cl.
CPC .............. *C08L 5/08* (2013.01); *C08B 37/003* (2013.01); *B82Y 40/00* (2013.01)

(58) Field of Classification Search
None
See application file for complete search history.

(56) References Cited

PUBLICATIONS

Taniguchi et al., "Characteristocs of chitin prepared by steam explosion method" Kichin Kitosan Kenkyu (2002) vol. 8 No. 1 pp. 7-10.*
English translation of Taniguchi et al. above. (2002) vol. 8 No. 1 pp. 7-10.*
Pichyangkura, R., "Application of Chitin-Chitosan From Marine By-Products in Thailand" (2014) downloaded from http://www.agnet.org/library.php?func=view&id=20140401150447.*
Darmanto, Y., "The Effect of Chitin and Chitosan of Crab Shell on Water Sorption of Isotherm and Denaturation of Myofibrils During Dehydration Process" Journal of Coastal Development (2002) vol. 5 No. 2 pp. 75-83.*
Tan et al., "Structural alterations, pore generation, and deacetylation of alpha- and beta-chitin submitted to steam explosion" Carbohydrate Polymers (2015) vol. 122 pp. 321-328.*

* cited by examiner

*Primary Examiner* — Eric Olson
(74) *Attorney, Agent, or Firm* — WPAT, PC; Justin King; Douglas A. Hosack

(57) ABSTRACT

The present invention discloses a method of preparing chitin nanofibers. By increasing the saturated moisture content of chitin and instantaneously releasing the pressure under a high temperature and high pressure environment, water within the chitin micro-particles is quickly evaporated and thus generated a high vapor pressure. Consequently, the interaction in chitin fiber is broken, and therefore the chitin nanofibers are obtained.

13 Claims, 9 Drawing Sheets

METHOD OF PREPARING CHITIN NANOFIBERS

FIELD OF THE INVENTION

The present invention relates to a method of preparing chitin nanofibers, and more particularly to a method of preparing chitin nanofibers by explosive puffing process.

BACKGROUND OF THE INVENTION

Chitin, the main component of the exoskeletons of arthropods, the pen of squid, the cell walls of fungi, and the like, is the second most abundant natural biopolymer in the world and is widely used in various application fields, such as agriculture, food/nutrition, medicine and biomedical engineering, material science, nanotechnology, cosmetics, wastewater treatment, paper production, textile industries, and the like.

Chitin molecule is a long-chain biopolymer which is composed of β-1,4-linked N-acetyl-D-glucosamine units. In the exoskeletons of arthropods, the pen of squid, and the cell walls of fungi, chitin molecules are grouped into tight bundles to form highly crystalline chitin nanofibers, wherein the structure of the chitin nanofiber is stabilized by hydrogen bonds and van der Waals forces. Many chitin nanofibers are interact with each other and proteins to form aggregated thicker and tight bundles, that is, the chitin microfibrils. Finally, many chitin microfibrils are interact with minerals and/or proteins and then aggregate a much bigger structure to form said exoskeletons of arthropods, said pen of squid, or said cell walls of fungi.

Generally, all of the commercial chitin products are composed of the exoskeletons of arthropods (or the pen of squid, the cell walls of fungi) in granule, powder, or piece form, wherein the exoskeletons (or pen, cell walls) are obtained through the steps of purifying the exoskeletons of arthropods (or the pen of squid, the cell walls of fungi) and removing the proteins and minerals in the purified exoskeletons (or squid pen, cell walls). Chitin in the present invention is the exoskeletons of arthropods, the pen of squid, the cell walls of fungi, or the like prepared by the same steps as these commercial chitin products.

Chitin is a good source of biological nanofiber. To obtain chitin nanofibers, destroying two forces in chitin microfibrils is required: (1) the force between chitin nanofibers; and (2) the force between chitin nanofiber and proteins/minerals.

Chitin is classified into three different crystalline forms: the Alpha-, Beta-, and Gamma-form, different in the arrangement of chitin molecule chains within chitin nanofibers. Alpha chitins (α-chitins) are composed of antiparallel chains and are found in the exoskeletons of insects. Beta chitins (β-chitins) are composed of parallel chains, often found in squid. Gamma chitins (γ-chitin) are composed of 2 parallel chains alternating with an antiparallel chain and are found in fungi.

At present, the methods for preparing chitin nanofiber includes a grinding method, an ultrasonic method, an electrospinning method, and an acid hydrolysis method. However, these methods are hard to be used in large scale production, take long time, use complex process, and thus have their limitation in application. Therefore, an easy and effective method for preparing a large number of chitin nanofibers is required.

SUMMARY OF THE INVENTION

For solving the drawbacks encountered from the prior art, the present invention provides an easy and effective method of preparing chitin nanofibers through explosive puffing process.

In accordance with an aspect of the present invention, the present invention provides a method of preparing chitin nanofibers, the method at least comprising steps of:

(a) using an aqueous solution to adjust a moisture content of the chitin to a predetermined moisture content value; wherein the predetermined moisture content value is higher than or equal to 35%;

(b) placing the chitin into a closed container;

(c) heating the closed container to a temperature greater than or equal to 175 degrees Celsius, so that a pressure in the closed container reaches a first pressure value, wherein the first pressure value is higher than or equal to 9 kg/cm$^2$;

(d) further heating for a period of time, wherein the period of time is at least 1 minute;

(e) instantaneously releasing the pressure in the closed container to atmospheric pressure, wherein the chitin nanofibers are formed within the chitin directly and the diameter of the chitin nanofibers is 10~250 nm; and (f) performing a drying process to rearrange the chitin nanofibers within the chitin.

Preferably, before the step (a), the method further comprises steps of:

(z1) mixing the chitin and hydrochloric acid, and waiting for at least half an hour;

(z2) mixing the chitin and sodium hydroxide, and waiting for at least half an hour; and (z3) washing the chitin with water until the chitin is neutral.

Preferably, in the step (c), the first pressure value is higher than or equal to 12 kg/cm$^2$.

DETAILED DESCRIPTION OF THE PREFERRED EMBODIMENT

For solving the drawbacks encountered from the prior art, the present invention provides an easy and effective method of preparing chitin nanofibers through explosive puffing process.

Chitin used to prepare chitin nanofibers in the present invention is purified from the exoskeletons of arthropods, the pen of squid, or the cell walls of fungi. The α-chitin used to prepare chitin nanofibers in the present invention comes from Charming & Beauty Co., Ltd (Taipei, Taiwan). In fact, any commercial chitin product or self-purified chitin could be used to prepare chitin nanofibers through the present invention.

Heating and puffing process is performed to puff chitin in the present invention. However, it is not intended to limit the present invention; any other method/device which could increase the pressure in chitin and then instantaneously release the pressure in the chitin could be used to heat and puff chitin according to the present invention.

The present invention uses puffing gun to perform said heating and puffing process. The puffing gun comes from Wang Hsign Feng Enterprise Co., Ltd (Taichung, Taiwan).

Figure 1:
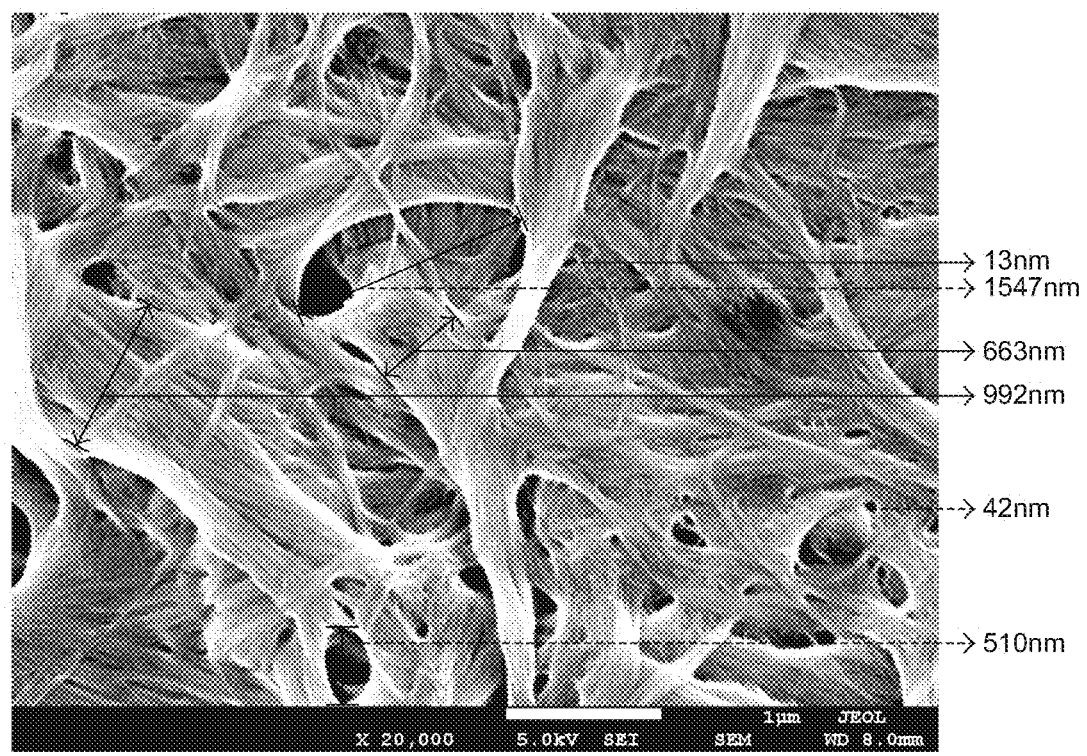
FIG. 1 is non-puffed α-chitin as seen under a scanning electron microscope (magnified 20,000 times).

Please see FIG. 1, which is non-puffed α-chitin as seen under a scanning electron microscope. FIG. 1 shows that the diameter of non-puffed α-chitin fibers ranges from 10 to 1000 nm, wherein the solid arrows indicate the fibers with diameter of 13 nm, 663 nm, and 992 nm. (a) In terms of fiber width, the widest fiber in this non-puffed α-chitin has a diameter of about 1000 nm; that is, some fibers in the non-puffed α-chitin are not nanoscale fibers since they have a diameter greater than 250 nm. (b) In terms of the diversity in fiber width, the range of diameter of fibers in this non-puffed α-chitin is 990 nm [In descriptive statistics, the range is the difference between the maximum and the minimum data value. For example, the range of diameter of fibers in this non-puffed α-chitin=1000−10=990 (nm)], which indicates that non-puffed α-chitin has a great diversity in fiber width and thus non-puffed α-chitin has its limitation on certain industrial applications, for example, on textile application. (c) In terms of the size of holes between fibers, the internal diameter of the holes between non-puffed α-chitin fibers are less than or equal to 1550 nm (Please refer to FIG. 1, dashed arrows indicate the holes with internal diameter of 42 nm and 1547 nm, and thus the holes between non-puffed α-chitin fibers is too big to be used in certain industries, for example, in sterile filtration of which the holes/pores must be smaller than 220 nm. (d) In terms of the arrangement of fibers, there are few non-puffed α-chitin fibers arranged in a subparallel manner and some even arranged in a perpendicular manner, and thus non-puffed α-chitin has its limitation on certain industrial applications, for example, on textile application.

Experiment 1: Prepare Chitin Nanofibers

Adjust the moisture content of the chitin and then heat the chitin in a closed container. When the pressure in the closed container reaches a predetermined high pressure because of heat and steam, instantaneously release the pressure in the closed container to atmospheric pressure to cause all of the water molecules within the chitin particles to evaporate instantaneously. Therefore, a strong vapor pressure is generated in the chitin micro-particles and results in the expansion of chitin micro-particles to all directions. During this process, the weaker force/linkage/interaction in chitin fibers is broken by heat and steam to produce expanded chitin particles and holes between the chitin fibers, and thus the strong vapor pressure in the chitin micro-particle could be released via the holes. Moreover, thinner nanofibers are obtained because of the breakage of weaker force/linkage/ interaction in chitin fiber, wherein the weaker force/linkage/ interaction in chitin fiber is the force/linkage/interaction between chitin nanofibers or/and the force/linkage/interaction between chitin nanofibers and proteins.

A method of preparing chitin nanofibers according to a first embodiment of the present invention at least comprises the following steps:

(a) using an aqueous solution to adjust a moisture content of the chitin to a predetermined moisture content value;

(b) placing the chitin into a closed container;

(c) heating the closed container to a predetermined temperature, so that a pressure in said closed container reaches a first pressure value;

(d) further heating for a first period of time;

(e) instantaneously releasing the pressure in the closed container to a second pressure value, wherein the chitin nanofibers are formed within the chitin directly; and (f) performing a drying process to rearrange the chitin nanofibers within the chitin.

For the detail of the step (a) in this embodiment, the step (a) comprises soaking the chitin in aqueous solution, draining excess water from chitin by using a sieve or by other method, and then putting the chitin in an oven with temperature at 50° C. to reduce the moisture content of the chitin to the predetermined moisture content value; however, other steps, temperature, or method could be used to adjust the moisture content of the chitin to the predetermined moisture content value as well. Preferably, the predetermined moisture content value is 10~90%. Preferably, the predetermined moisture content value is greater than or equal to 35%. In the present invention, Infared Moisture Analyzer (IR35M, Denver Instrument, Germany) is used to measure the moisture content of the chitin.

In the step (a) of this embodiment, the aqueous solution is water; however, the aqueous solution could be a neutral aqueous solution, a weakly acidic aqueous solution, an alkaline aqueous solution, or other aqueous solution as well.

It is noted that the predetermined moisture content value in the step (a) plays an important role in preparing chitin nanofibers according to the present invention because moisture content in the chitin will affect puffing status, vapor pressure, and how successful or how horribly charred the chitin is in preparing chitin nanofibers (chitin with low moisture content becomes charred frequently after heating process).

Preferably, the predetermined moisture content value is the saturated moisture content of the chitin.

In the step (b), the closed container is a puffing gun or other pressure vessel with high-pressure safety system.

In the step (c), the predetermined temperature should be higher than or equal to the boiling point of the aqueous solution under the atmospheric pressure (i.e. the gauge pressure is 0 $kg/cm^2$), and thus the aqueous solution will evaporate to produce a lot of steam; therefore, vapor pressure in the closed container reaches the first pressure value. For example, if the predetermined temperature is set at about 164° C., the pressure in the closed container will finally reach 7 $kg/cm^2$ (therefore, the first pressure value is 7 $kg/cm^2$). If the predetermined temperature is set at about 175° C., the pressure in the closed container will finally reach 9 $kg/cm^2$ (therefore, the first pressure value is 9 $kg/cm^2$). If the predetermined temperature is set at about 187° C., the pressure in the closed container will finally reach 12 $kg/cm^2$ (therefore, the first pressure value is 12 $kg/cm^2$). If the predetermined temperature is set at about 198° C., the pressure in the closed container will finally reach 15 $kg/cm^2$ (therefore, the first pressure value is 15 $kg/cm^2$). The first pressure value should be higher than atmospheric pressure. Preferably, the first pressure value is higher than or equal to 9 $kg/cm^2$. Preferably, the first pressure value is higher than or equal to 12 $kg/cm^2$. Preferably, the first pressure value is higher than or equal to 15 $kg/cm^2$.

After the pressure in the closed container reaches a first pressure value in the step (c), perform the step (d); that is, continuously and further heating for a first period of time. Preferably, the first period of time is less than or equal to 10 minutes. Preferably, the first period of time is at least 1 minute. Preferably, the first period of time is 5~10 minutes.

In the step (e), when the pressure in the closed container reduces from the first pressure value to the second pressure value, the force/linkage/interaction in chitin fibers is broken and thus directly forms the chitin nanofibers, wherein the diameter of the chitin nanofibers is 10~250 nm.

The second pressure value is the atmospheric pressure or any other pressure less than the first pressure value. If there is proper safety system, the second pressure value may be even less than the atmospheric pressure (e.g. put the closed container in a negative pressure room or a vacuum environment to release the pressure in the closed container to a second pressure value less than the atmospheric pressure).

In the step (f), perform a drying process to directly rearrange the chitin nanofibers obtained from the step (e), and thus the chitin nanofibers become subparallel after the rearrangement of chitin nanofibers. Preferably, chitin nanofibers on a surface plate of chitin particle become subparallel, and chitin nanofibers on a plate which is parallel to the surface plate become subparallel as well. Preferably, the drying process in the step (f) is placing the chitin at 60° C. for hours. Preferably, the drying process in the step (f) is placing the chitin at 60° C. overnight. Preferably, the drying process in the step (f) is placing the chitin at 60° C. for 8~12 hours.

Experiment 2: Effect of the First Pressure Value on Preparing Chitin Nanofibers

Figure 2A:
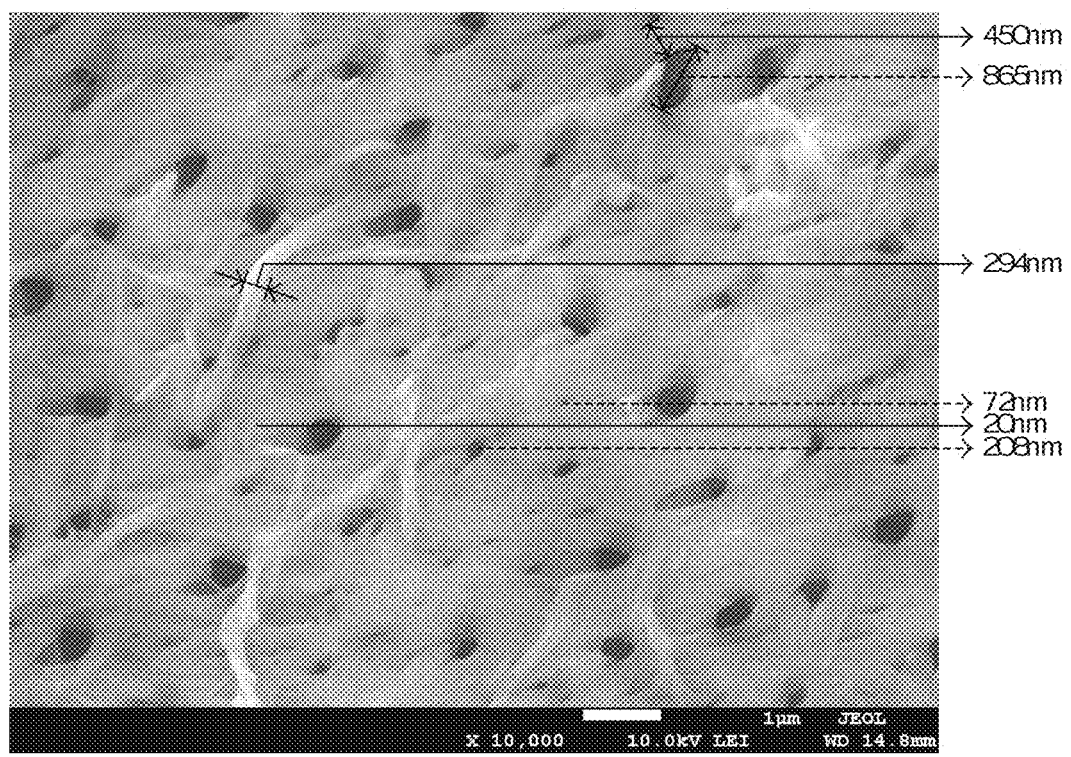
FIG. 2A is puffed α-chitin fibers prepared through explosive puffing processes as seen under a scanning electron microscope, wherein the processes is: when the gauge pressure reached 9 kg/cm$^2$, α-chitin with moisture content of 50% undergoes explosive puffing process immediately (not further heating; magnified 10,000 times).

The method of preparing chitin nanofibers according to the second embodiment of the present invention at least comprises the following steps:

(a1) using water to adjust a moisture content of the chitin to 50%;

(b1) placing the chitin into a closed container;

(c1) heating the closed container to 175° C. or 187° C., so that a pressure in said closed container reaches a first pressure value (Please refer to FIG. 2A, in which the closed container is heated to 175° C., and so that the first pressure value reaches 9 $kg/cm^2$. Please refer to FIG. 2B, in which the closed container is heated to 187° C., and so that the first pressure value reaches 12 $kg/cm^2$);

(d1) further heating for 0 minute;

(e1) instantaneously releasing the pressure in the closed container to the atmospheric pressure, wherein the chitin nanofibers are formed within the chitin directly; and (f1) performing a drying process to rearrange the chitin nanofibers within the chitin, wherein the drying process in the step (f) is placing the chitin at 60° C. overnight.

Please see FIG. 2A, which is puffed α-chitin fibers prepared through explosive puffing processes, wherein said processes is: when the gauge pressure reached 9 $kg/cm^2$, α-chitin with moisture content of 50% undergoes explosive puffing process immediately. Please see FIG. 2B, which is puffed α-chitin fibers prepared through explosive puffing processes, wherein said processes is: when the gauge pressure reached 12 $kg/cm^2$, α-chitin with moisture content of 50% undergoes explosive puffing process immediately.

FIG. 2A shows that the diameter of puffed α-chitin fibers, which are puffed at the moment that the first pressure value reaches 9 $kg/cm^2$, ranges from 10 to 450 nm. The solid arrows in FIG. 2A indicate the fibers with diameter of 20 nm, 294 nm, and 450 nm. It shows that explosive puffing process indeed breaks the weaker force/linkage/interaction between chitin nanofibers and breaks the weaker force/linkage/interaction between chitin nanofiber and protein, so that diameter of the α-chitin fibers becomes much thinner. That is, the diameter of the α-chitin fibers reduces form 10~1000 nm to 10~450 nm.

Please refer to FIG. 2A, (a) in terms of fiber width, the widest fiber in this puffed α-chitin has a diameter of about 450 nm; that is, some fibers in this puffed α-chitin are still not nanoscale fibers since they have a diameter greater than 250 nm. (b) In terms of the diversity in fiber width, the range of diameter of fibers in this puffed α-chitin is 440 nm, which indicates that this puffed α-chitin has a great diversity in fiber width and thus has its limitation on certain industrial applications, for example, on textile application. (c) In terms of the size of holes between fibers, the internal diameter of the holes between these puffed α-chitin fibers are less than or equal to 865 nm (Please refer to FIG. 2A, dashed arrows indicate the holes with internal diameter of 72 nm, 208 nm, and 865 nm). It shows that the internal diameter of the holes shrink after the explosive puffing process, so that the internal diameter of the largest hole reduces form 1550 nm to 865 nm and the holes are similar in size.

Figure 2B:
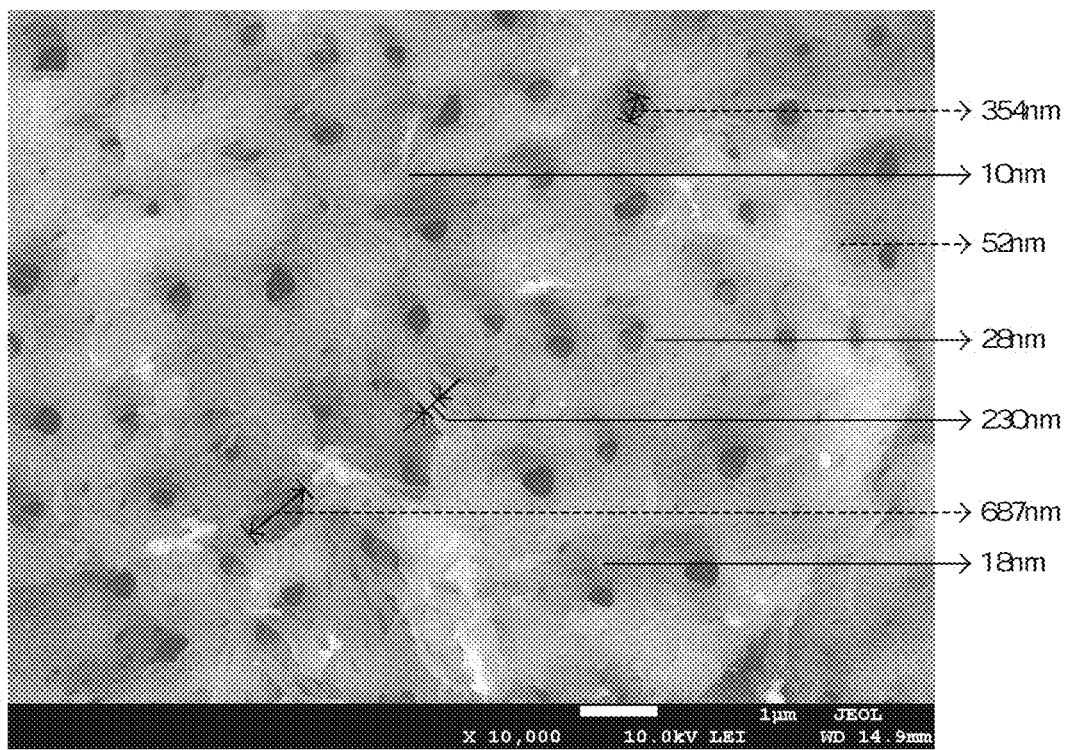
FIG. 2B is puffed α-chitin fibers prepared through explosive puffing processes as seen under a scanning electron microscope, wherein said processes is: when the gauge pressure reached 12 kg/cm$^2$, α-chitin with moisture content of 50% undergoes explosive puffing process immediately (not further heating; magnified 10,000 times).

FIG. 2B shows that the diameter of puffed α-chitin fibers, which are puffed at the moment that the first pressure value reaches 12 $kg/cm^2$, ranges from 10 to 230 nm. The solid arrows in FIG. 2B indicate the fibers with diameter 10 nm, 18 nm, 28 nm, and 230 nm.

Please refer to FIG. 2B, (a) in terms of fiber width, the widest fiber in this puffed α-chitin has a diameter of about 230 nm; that is, this puffed α-chitin are nanoscale fibers since they have a diameter smaller than 250 nm. (b) In terms of diversity in fiber width, the range of diameter of fibers in this puffed α-chitin is 220 nm, which indicates that fibers in this puffed α-chitin are similar in width to each other. (c) In terms of the size of holes between fibers, the internal diameter of the holes between these puffed α-chitin fibers are less than or equal to 690 nm (Please refer to FIG. 2B, dashed arrows indicate the holes with internal diameter of 52 nm, 354 nm, and 687 nm).

Therefore, the higher the first pressure value before the explosive puffing process is, the smaller the diameter of the obtained chitin nanofibers it will be. For example, elevate the first pressure value from 9 kg/cm$^2$ to 12 kg/cm$^2$, the diameter of the obtained chitin nanofibers reduces from 10~450 nm to 10~230 nm. Consequently, higher first pressure value should be used to produce thinner chitin nanofibers. The first pressure value could be 9 kg/cm$^2$ or 12 kg/cm$^2$. Preferably, the first pressure value could be elevated to higher than 9 kg/cm$^2$, higher than 12 kg/cm$^2$, or higher than or equal to 15 kg/cm$^2$.

Figure 3A:
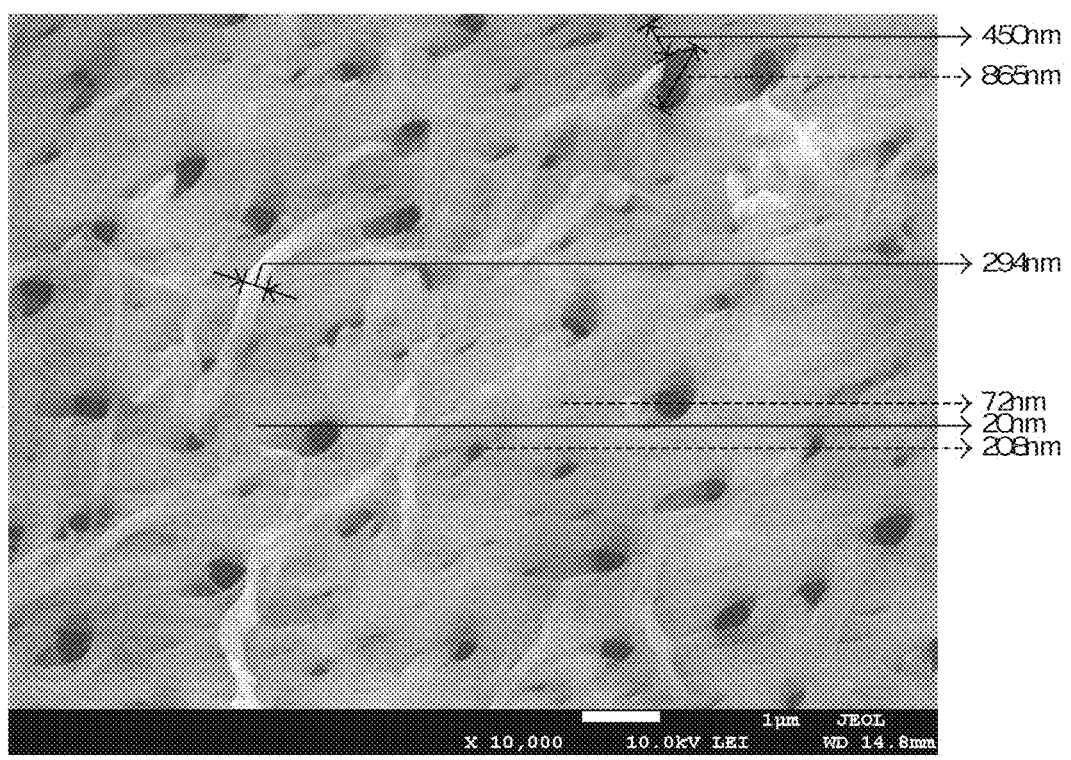
FIG. 3A is puffed α-chitin fibers prepared through explosive puffing processes as seen under a scanning electron microscope, wherein said processes is: when the gauge pressure reached 9 kg/cm$^2$, α-chitin with moisture content of 50% undergoes explosive puffing process immediately (not further heating; magnified 10,000 times).

Experiment 3: Effect of Continuously and Further Heating on Preparing Chitin Nanofibers The method of preparing chitin nanofibers according to the third embodiment of the present invention at least comprises the following steps:

(a2) using water to adjust a moisture content of the chitin to 50%;

(b2) placing the chitin into a closed container;

(c2) heating the closed container to 175° C., so that a pressure in said closed container reaches 9 kg/cm$^2$;

(d2) further heating for a first period of time (Please refer to FIG. 3A, in which the closed container is further heated for 0 minute. Please refer to FIG. 3B, in which the closed container is further heated for 5 minutes);

(e2) instantaneously releasing the pressure in the closed container to the atmospheric pressure, wherein the chitin nanofibers are formed within the chitin directly; and (f2) performing a drying process to rearrange the chitin nanofibers within the chitin, wherein the drying process in the step (0 is placing the chitin at 60° C. overnight.

Please see FIG. 3A (the same figure as FIG. 2A), which is puffed α-chitin fibers prepared through explosive puffing processes, wherein said processes is: when the gauge pressure reached 9 kg/cm$^2$, α-chitin with moisture content of 50% undergoes explosive puffing process immediately. Please see FIG. 3B, which is puffed α-chitin fibers prepared through explosive puffing processes, wherein said processes is: after the gauge pressure reached 9 kg/cm$^2$ and then further heating for 5 minutes, α-chitin with moisture content of 50% undergoes explosive puffing process.

FIG. 3A shows the diameter of puffed α-chitin fibers range from 10 to 450 nm, wherein the α-chitin is not further heated for a period of time in the step (d2). Please refer to the description of FIG. 2A in experiment 2 to find out the information of FIG. 3A about the fiber width, diversity in fiber width, and size of holes between fibers.

Figure 3B:
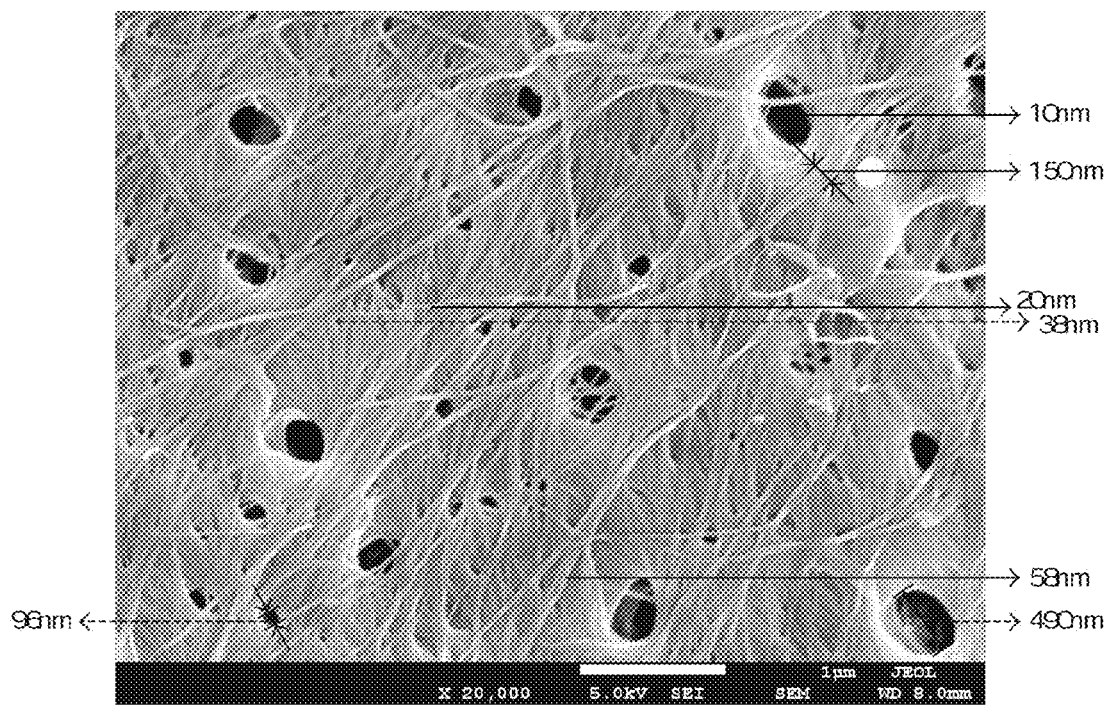
FIG. 3B is puffed α-chitin fibers prepared through explosive puffing processes as seen under a scanning electron microscope, wherein said processes is: after the gauge pressure reached 9 kg/cm$^2$ and then further heating for 5 minutes, α-chitin with moisture content of 50% undergoes explosive puffing process (further heating; magnified 20,000 times).

FIG. 3B shows the diameter of puffed α-chitin fibers range from 10 to 150 nm, wherein the α-chitin is further heated for 5 minutes in the step (d2). The solid arrows in FIG. 3B indicate the fibers with diameter of 10 nm, 20 nm, 58 nm, and 150 nm.

Please refer to FIG. 3B, (a) in terms of fiber width, the widest fiber in this puffed α-chitin has a diameter of about 150 nm; that is, the fibers in this puffed α-chitin. (b) In terms of diversity in fiber width, the range of diameter of fibers in this puffed α-chitin is 140 nm, which indicates that fibers in this puffed α-chitin are similar in width to each other and thus are proper for industrial application. (c) In terms of the size of holes between fibers, the internal diameter of the holes between these puffed α-chitin fibers are less than or equal to 490 nm (Please refer to FIG. 3B, dashed arrows indicate the holes with internal diameter of 38 nm, 96 nm, and 490 nm), wherein the holes are not small enough in some industrial application, for example, in sterile filtration.

Therefore, further heating before the puffing process result in thinner chitin nanofibers. For example, further heating for 5 minutes reduces the diameter of the produced fibers from 10~450 nm to 10~150 nm. Consequently, further heating for at least 1 minute is proper for produce thinner chitin nanofibers, wherein the further heating period should not be too long to avoid charring chitin particles. Preferably, further heating for 5~10 minutes.

Figure 4A:
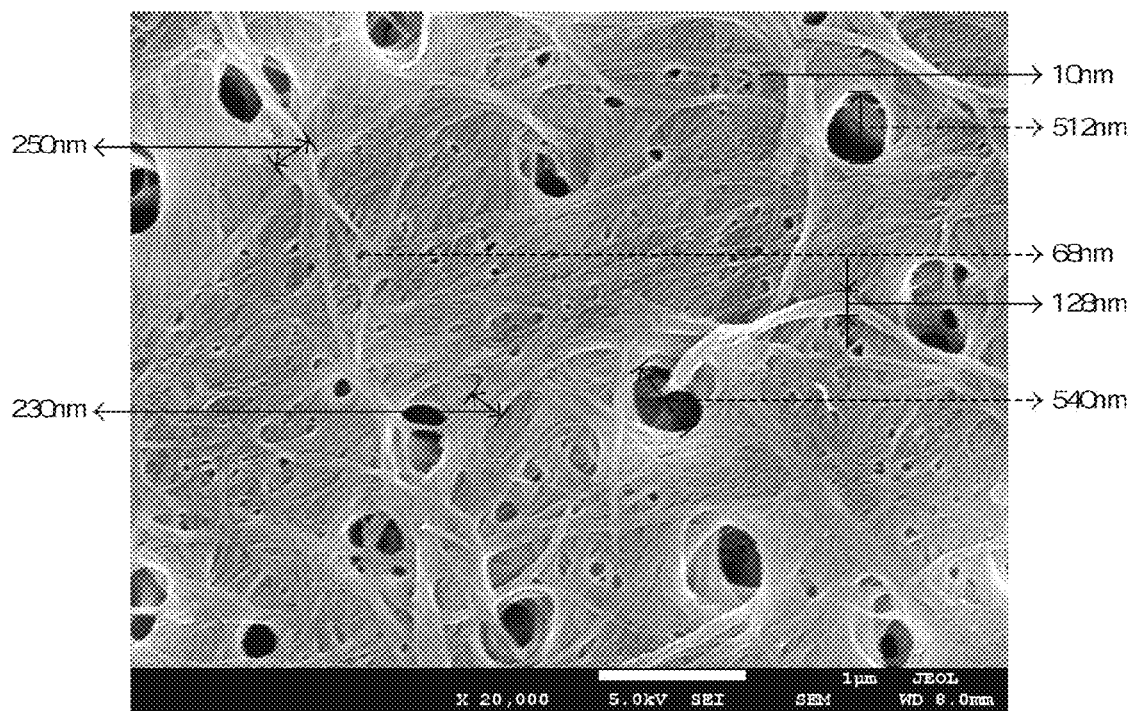
FIG. 4A is puffed α-chitin fibers prepared through explosive puffing processes as seen under a scanning electron microscope, wherein said processes is: after the gauge pressure reached 9 kg/cm$^2$ and then further heating for 5 minutes, α-chitin with moisture content of 35% undergoes explosive puffing process (further heating; magnified 20,000 times).

Experiment 4: Effect of Moisture Content of the Chitin Particles on Preparing Chitin Nanofibers The method of preparing chitin nanofibers according to the forth embodiment of the present invention at least comprises the following steps:

(a3) using water to adjust a moisture content of the chitin to a predetermined moisture content value (Please refer to FIG. 4A, in which the predetermined moisture content value is 35%. Please refer to FIG. 4B, in which the predetermined moisture content value is 50%);

(b3) placing the chitin into a closed container;

(c3) heating the closed container to 175° C., so that a pressure in said closed container reaches 9 kg/cm$^2$;

(d3) further heating for 5 minutes;

(e3) instantaneously releasing the pressure in the closed container to the atmospheric pressure, wherein the chitin nanofibers are formed within the chitin directly; and (f3) performing a drying process to rearrange the chitin nanofibers within the chitin, wherein the drying process in the step (0 is placing the chitin at 60° C. overnight.

Please see FIG. 4A, which is puffed α-chitin fibers prepared through explosive puffing processes, wherein said processes is: after the gauge pressure reached 9 kg/cm$^2$ and then further heating for 5 minutes, α-chitin with moisture content of 35% undergoes explosive puffing process. Please see FIG. 4B (the same figure as FIG. 3B), which is puffed α-chitin fibers prepared through explosive puffing processes, wherein said processes is: after the gauge pressure reached 9 kg/cm$^2$ and then further heating for 5 minutes, α-chitin with moisture content of 50% undergoes explosive puffing process.

FIG. 4A shows that the diameter of puffed α-chitin fibers ranges from 10 to 250 nm, wherein the predetermined moisture content value of the α-chitin before the puffing process is 35%. The solid arrows in FIG. 4A indicate the puffed α-chitin fibers with diameter of 10 nm, 128 nm, 230 nm, and 250 nm.

Please refer to FIG. 4A, (a) in terms of fiber width, the widest fiber in this puffed α-chitin has a diameter of about 250 nm. (b) In terms of the diversity in fiber width, the range of diameter of fibers in this puffed α-chitin is 240 nm. (c) In terms of the size of holes between fibers, the internal diameter of the holes between these puffed α-chitin fibers are less than or equal to 540 nm (Please refer to FIG. 4A, dashed arrows indicate the holes with internal diameter of 68 nm, 512 nm, and 540 nm).

Figure 4B:
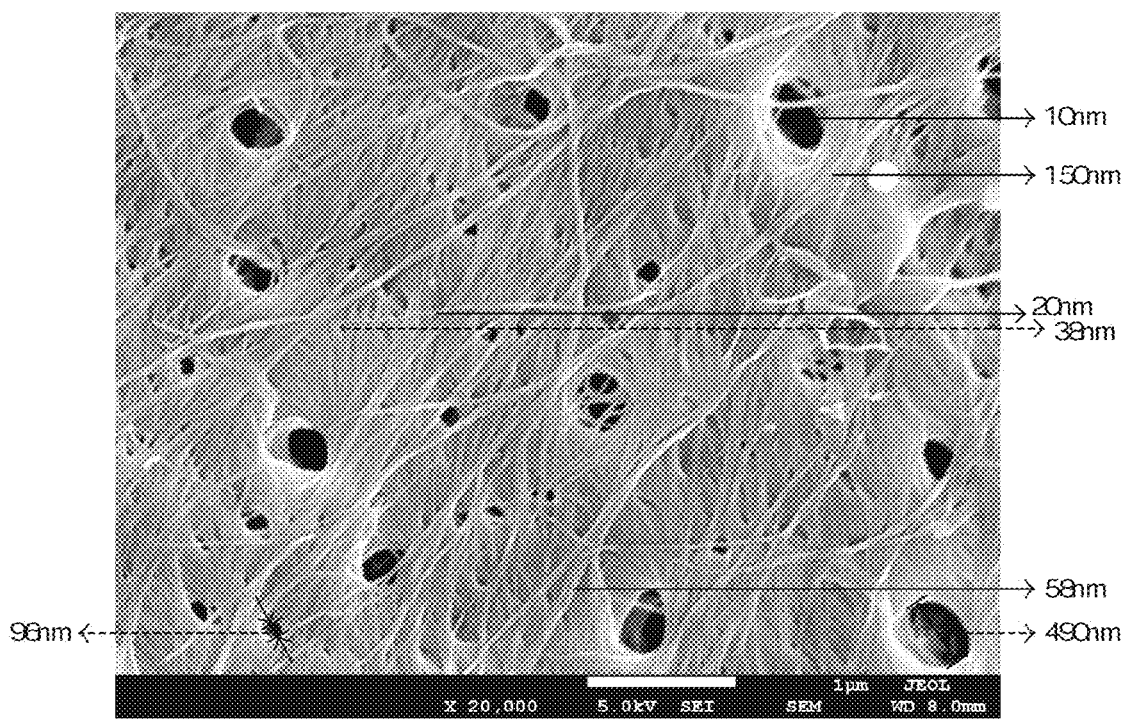
FIG. 4B is puffed α-chitin fibers prepared through explosive puffing processes as seen under a scanning electron microscope, wherein said processes is: after the gauge pressure reached 9 kg/cm$^2$ and then further heating for 5 minutes, α-chitin with moisture content of 50% undergoes explosive puffing process (further heating; magnified 20,000 times).

FIG. 4B shows that the diameter of puffed α-chitin fibers ranges from 10 to 150 nm, wherein the predetermined moisture content value of the α-chitin before the puffing process is 50%. The solid arrows in FIG. 4B indicate the fibers with diameter 10 nm, 20 nm, 58 nm, and 150 nm. Please refer to the description of FIG. 3B in experiment 3 to find out the information of FIG. 4B about the fiber width, diversity in fiber width, and size of holes between fibers.

Therefore, the higher the predetermined moisture content value before the puffing process is, the smaller the diameter of the obtained chitin nanofibers it will be. For example, elevate predetermined moisture content value from 35% to 50%, the diameter of the obtained chitin nanofibers reduces from 10~250 nm to 10~150 nm. Consequently, elevating predetermined moisture content value as high as possible is required to produce thinner chitin nanofibers.

Experiment 5

Effect of Acid- and Alkali-Pretreatment on Preparing Chitin Nanofibers

The former experimental results in the present invention show that not only the first pressure value and the further heating period but also moisture content of the chitin particles are the key factors in preparing chitin nanofibers. However, because of saturated moisture content, the moisture content of chitin may not be elevated to high enough to prepare proper chitin nanofibers.

For instance, the saturated moisture content of our α-chitin is 60%. Elevating the saturated moisture content of α-chitin to a higher level and adjusting the moisture content of the chitin to this higher level may help to prepare thinner chitin nanofibers.

Therefore, a pretreatment method is provided in the present invention to elevate the saturated moisture content of chitin. That is, before the step (a) in the experiment 1, the method of preparing chitin nanofibers may further comprise the pretreatment steps:

(z1) mixing the chitin and hydrochloric acid, and waiting for at least half an hour;

(z2) mixing the chitin and sodium hydroxide, and waiting for at least half an hour; and (z3) washing the chitin with water until the chitin is neutral.

Preferably, in the step (z1), the chitin is mixed with 2N hydrochloric acid, whereafter wait for at least 2 hours at room temperature.

Preferably, in the step (z2), the chitin is mixed with 2N sodium hydroxide, whereafter wait for at least 2 hours at 80° C.

A. Effect of Acid- and Alkali-Treatment on Saturated Moisture Content of Chitin

Figure 5:
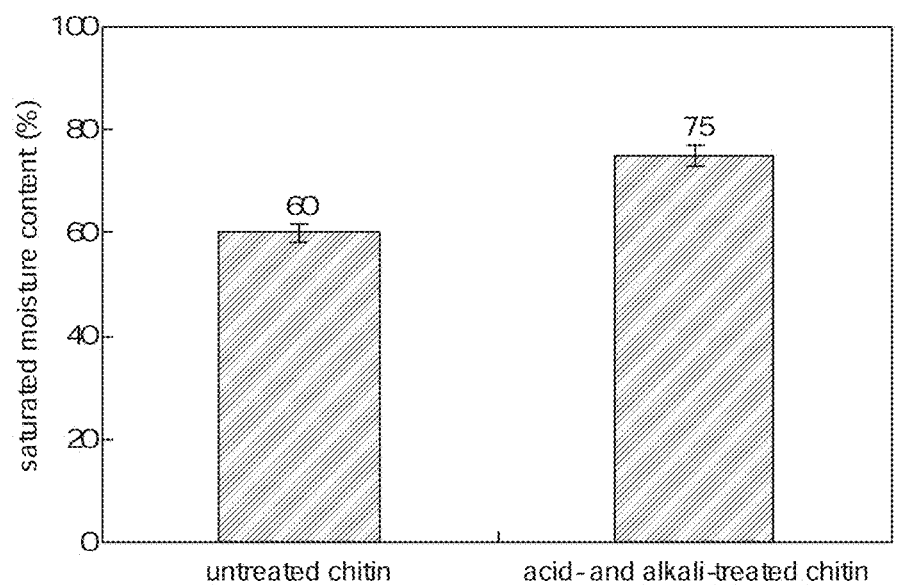
FIG. 5 is a column chart presenting the influence of acid- and alkaline-treatment on the saturated moisture content of α-chitin.

Please see FIG. 5, which is a column chart presenting the influence of acid- and alkaline-treatment on the saturated moisture content of α-chitin. FIG. 5 presents untreated chitin group and acid- and alkali-treated chitin group on the horizontal axis from left to right in order, wherein the acid- and alkali-treatment process comprises:

(z1') mixing the α-chitin and 2 N hydrochloric acid, and waiting for at least 2 hours at room temperature;

(z2') mixing the α-chitin and 2 N sodium hydroxide, and waiting for at least 2 hours at 80° C.; and (z3') washing the α-chitin with water until the α-chitin is neutral.

FIG. 5 shows that the saturated moisture content of α-chitin in untreated chitin group is 60%, and the saturated moisture content of α-chitin in acid- and alkali-treated chitin group is significantly elevated to 75%. That is, the pretreatment method, an acid- and alkali-treatment method, provided in the present invention could significantly elevate the saturated moisture content of chitin and thus may help in preparing thinner chitin nanofibers.

B. Effect of Acid- and Alkali-Pretreatment on Preparing Chitin Nanofibers

The acid- and alkali-pretreated α-chitin, which has been treated with the (z1')~(z3') process, is used to preparing chitin nanofibers according to the fifth embodiment of the present invention. The fifth embodiment of the present invention at least comprises the following steps, wherein the chitin in these steps is the acid- and alkali-pretreated α-chitin:

(a4) using water to adjust a moisture content of the chitin to 75%;

(b4) placing the chitin into a closed container;

(c4) heating the closed container to 175° C., so that a pressure in said closed container reaches 9 kg/cm$^2$;

(d4) further heating for 5 minutes;

(e4) instantaneously releasing the pressure in the closed container to the atmospheric pressure, wherein the chitin nanofibers are formed within the chitin directly; and (f4) performing a drying process to rearrange the chitin nanofibers within the chitin, wherein the drying process in the step (f) is placing the chitin at 60° C. overnight.

Figure 6:
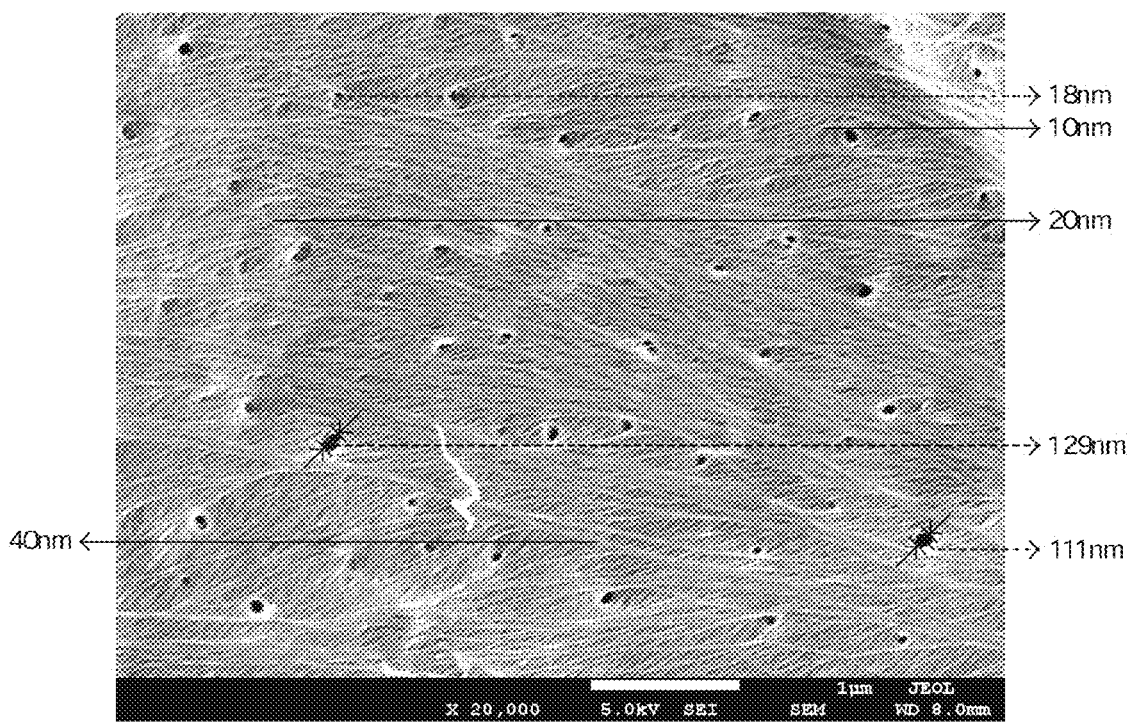
FIG. 6 is puffed α-chitin fibers prepared through explosive puffing processes as seen under a scanning electron microscope, wherein said processes is: after the gauge pressure reached 9 kg/cm$^2$ and then further heating for 5 minutes, α-chitin with moisture content of 75% undergoes explosive puffing process (further heating; magnified 20,000 times).

Please see FIG. 6, which is puffed α-chitin fibers prepared through explosive puffing processes, wherein said processes is: after the gauge pressure reached 9 kg/cm$^2$ and then further heating for 5 minutes, α-chitin with moisture content of 75% undergoes explosive puffing process. FIG. 6 shows that the diameter of the puffed acid- and alkali-pretreated α-chitin fibers range from 10 to 40 nm, wherein the predetermined moisture content value before the puffing process is 75%. The solid arrows in FIG. 6 indicate the fibers with diameter of 10 nm, 20 nm, and 40 nm. (a) In terms of fiber width, the widest fiber in this puffed α-chitin has a diameter of about 40 nm, which is a good fiber in nanoscale. (b) In terms of diversity in fiber width, the range of diameter of fibers in this puffed α-chitin is 30 nm, and thus these fibers are similar in width to each other. (c) In terms of the size of holes between fibers, the internal diameter of the holes between these puffed α-chitin fibers are less than or equal to 130 nm (Please refer to FIG. 6, dashed arrows indicate the holes with internal diameter of 18 nm, 111 nm, and 129 nm). It indicates that the internal diameter of the holes shrinks to 130 nm after chitin nanofibers rearranges in the step (f4), wherein these holes are small enough for more industrial application, for example, for sterile filtration. (d) In terms of the arrangement of fibers, these fibers arranged in a subparallel manner. It indicates that after chitin nanofibers rearrange in the step (f4), the chitin nanofibers on the surface plate of chitin particle become subparallel, and chitin nanofibers on a plate which is parallel to the surface plate become subparallel as well. Therefore, these puffed α-chitin could be used on more industrial applications, for example, on textile application.

The results in experiment 5 indicate that acid- and alkali-pretreatment elevates the saturated moisture content of the α-chitin to 75% and results in some unexpected results. That is, using acid- and alkali-pretreated α-chitin with moisture content of 75% to prepare chitin nanofibers via the puffing process will produce thinner chitin nanofibers of which the diameter is 10~40 nm (Please refer to FIG. 4B, the diameter of the puffed α-chitin with moisture content of 50% is 10~150 nm) and smaller holes between the chitin nanofibers, wherein the internal diameter of the holes shrink to less than or equal to 130 nm after chitin nanofibers rearrange in the drying process (Please refer to FIG. 4B, the internal diameter of the holes is less than or equal to 490 nm when using α-chitin with moisture content of 50% to prepare chitin nanofibers). Moreover, using acid- and alkali-pretreated α-chitin with moisture content of 75% to prepare chitin nanofibers via the puffing process will make chitin nanofibers on a surface plate of the chitin particle and on a plate which is parallel to the surface plate tend to become subparallel after fibers rearrange in the drying process. Therefore, these chitin nanofibers have more industrial value based on these unexpected benefits. That is, performing acid- and alkali-pretreatment method elevates the saturated moisture content of the α-chitin to 75%, adjusting the moisture content of the α-chitin to 75%, and performing drying process to rearrange the chitin nanofibers within α-chitin are the key features to prepare the best chitin nanofibers according to the present invention.

It is to be understood that the difference between α-chitin, β-chitin, and γ-chitin is merely the arrangement of chitin molecule chains within chitin nanofibers. Based on inventor's experiment results, using β-chitin and γ-chitin to prepare chitin nanofibers according to the present invention give a similar result with α-chitin. Therefore, it is to be understood that not only α-chitin but also β-chitin and γ-chitin are included within the spirit and scope of the appended claims.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of preparing chitin nanofibers, the method comprising steps of:
    (a) using an aqueous solution to adjust a moisture content of the chitin to a predetermined moisture content value, wherein the predetermined moisture content value is higher than or equal to 35%;
    (b) placing the chitin into a closed container;
    (c) heating the closed container to a temperature greater than or equal to 175 degrees Celsius, so that a pressure in the closed container reaches a first pressure value, wherein the first pressure value is higher than or equal to 9 kg/cm$^2$;
    (d) further heating for at least 1 minute;
    (e) instantaneously releasing the pressure in the closed container to atmospheric pressure, wherein the chitin nanofibers are formed within the chitin directly and the diameter of the chitin nanofibers is 10~250 nm; and
    (f) performing a drying process, comprising placing the chitin at 60° C. for hours to dry the chitin and to rearrange the chitin nanofibers within the chitin.

2. The method according to claim 1, wherein the predetermined moisture content value in the step (a) is the saturated moisture content of the chitin.

3. The method according to claim 2, wherein before the step (a), the method further comprises steps of:
    (z1) mixing the chitin and hydrochloric acid, and waiting for at least half an hour;
    (z2) mixing the chitin and sodium hydroxide, and waiting for at least half an hour; and
    (z3) washing the chitin with water until the chitin is neutral.

4. The method according to claim 3, whereafter the step (f), the diameter of the chitin nanofibers is 10~40 nm.

5. The method according to claim 3, wherein there are multiple holes between the chitin nanofibers in the step (e), and the internal diameter of the holes shrink to less than or equal to 130 nm after chitin nanofibers rearranges in the step (f).

6. The method according to claim 3, wherein the chitin has a surface plate, and the chitin nanofibers on the surface plate tend to become subparallel after chitin nanofibers rearranges in the step (f).

7. The method according to claim 3, wherein the saturated moisture content of the chitin in the step (a) increases to 75% after performing the steps (z1)~(z3).

8. The method according to claim 3, in the step (z1), the chitin is mixed with 2 N hydrochloric acid and then wait for at least 2 hours at room temperature.

9. The method according to claim 3, in the (z2), the chitin is mixed with the 2 N sodium hydroxide and then wait for at least 2 hours at 80° C.

10. The method according to claim 1, wherein in the step (c), the first pressure value is higher than or equal to 12 kg/cm$^2$.

11. The method according to claim 1, wherein in the step (c), the first pressure value is higher than or equal to 15 kg/cm$^2$.

12. The method according to claim 1, wherein in the step (d), the period of time is 5~10 minutes.

13. The method according to claim 1, wherein the chitin is selected from at least one of α-chitin, β-chitin, and γ-chitin.

* * * * *